(12) United States Patent
Bykampadi et al.

(10) Patent No.: US 10,645,583 B2
(45) Date of Patent: May 5, 2020

(54) SECURITY MANAGEMENT FOR ROAMING SERVICE AUTHORIZATION IN COMMUNICATION SYSTEMS WITH SERVICE-BASED ARCHITECTURE

(71) Applicant: Nokia Technologies Oy, Espoo (FI)

(72) Inventors: Nagendra S. Bykampadi, Bangalore (IN); Suresh P. Nair, Whippany, NJ (US)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 16/014,567

(22) Filed: Jun. 21, 2018

(65) Prior Publication Data
US 2019/0253894 A1    Aug. 15, 2019

(30) Foreign Application Priority Data

Feb. 15, 2018   (IN) .............................. 201841005882

(51) Int. Cl.
*H04W 12/08*      (2009.01)
*H04W 12/06*      (2009.01)
(Continued)

(52) U.S. Cl.
CPC ........... *H04W 12/08* (2013.01); *H04L 9/3247* (2013.01); *H04L 63/0807* (2013.01); *H04W 8/12* (2013.01);
(Continued)

(58) Field of Classification Search
CPC ....... H04W 84/005; H04W 8/20; H04W 4/80; H04W 8/12; H04W 12/06; H04W 12/08;
(Continued)

(56) References Cited

U.S. PATENT DOCUMENTS

2008/0076425 A1 * 3/2008 Khetawat .............. H04W 88/12
                                                         455/436
2013/0080779 A1 * 3/2013 Holtmanns ......... H04L 63/0414
                                                         713/168
(Continued)

FOREIGN PATENT DOCUMENTS

WO       2017004373 A1    1/2017
WO       2018013925 A1    1/2018
WO    PCT/FI2019/050108   4/2019

OTHER PUBLICATIONS

3GPP, "3rd Generation Partnership Project; Technical Specification Group Services and System Aspects; System Architecture for the 5G System; Stage 2 (Release 15)," 3GPP TS 23.501, V15.0.0, Dec. 2017, 181 pages.

(Continued)

*Primary Examiner* — Nimesh Patel
(74) *Attorney, Agent, or Firm* — Ryan, Mason & Lewis, LLP (57) ABSTRACT

Security management techniques for roaming service authorization for communication systems are provided. In one or more methods, a first element or function in a visiting network of a communication system receives a first service discovery request from a second element or function in the visiting network for services provided by at least a third element or function in a home network of the communication system, sends a second service discovery request to a fourth element or function in the home network of the communication system responsive to authenticating the second element or function, receives from the fourth element or function a first service discovery response comprising an access token for the second element or function, and provides to the second element or function a second service discovery response comprising the access token, the access token being used by the second element or function to access (Continued)

the one or more services provided by the third element or function.

22 Claims, 8 Drawing Sheets

(51) Int. Cl.
| | |
|---|---|
| *H04W 8/12* | (2009.01) |
| *H04L 29/06* | (2006.01) |
| *H04W 48/16* | (2009.01) |
| *H04L 9/32* | (2006.01) |
| *H04W 48/04* | (2009.01) |

(52) U.S. Cl.
CPC .......... *H04W 12/06* (2013.01); *H04W 48/04* (2013.01); *H04W 48/16* (2013.01)

(58) Field of Classification Search
CPC .......... H04W 4/50; H04W 4/70; H04W 8/06; H04W 8/10; H04W 8/205; H04W 8/26; H04W 4/24; H04W 76/10; H04W 80/04; H04W 84/045; H04W 8/02; H04W 84/16; H04W 92/02; H04W 88/12; H04W 4/04; H04W 88/16; H04W 84/12; H04W 88/08; H04W 4/00; H04W 76/12; H04W 12/10; H04W 48/16; H04W 68/12; H04W 8/005; H04W 8/18; H04W 8/22; H04W 88/02; H04W 60/00; H04W 12/04; H04W 12/02; H04W 12/00; H04W 12/12; H04W 76/00; H04W 76/27; H04W 36/08; H04W 72/0453; H04W 76/11; H04W 80/08; H04W 28/24; H04W 8/04; H04W 48/20; H04W 80/00; H04W 88/06; H04W 28/16; H04W 80/045; H04W 88/182; H04W 8/065; H04W 8/08; H04W 24/04; H04W 72/0406; H04W 4/023; H04W 4/38; H04W 72/0433; H04W 72/048; H04W 80/06; H04W 40/04; H04W 72/12; H04W 84/042; H04B 7/14; H04B 1/0057; H04B 1/006; H04B 1/3833; H04B 1/406; H04B 1/48; H04L 65/1006; H04L 63/0823; H04L 65/1069; H04L 12/2809; H04L 2012/2841; H04L 67/125; H04L 41/0654; H04L 51/00; H04L 51/38; H04L 61/6054; H04L 65/1073; H04L 65/60; H04L 41/0896; H04L 63/0442; H04L 63/06; H04L 63/083; H04L 63/0876; H04L 67/306; H04L 63/0272; H04L 29/12066; H04L 29/12103; H04L 12/6418; H04L 12/66; H04L 2012/6443; H04L 2012/6486; H04L 63/0815; H04L 63/102; H04L 63/0861; H04L 63/08; H04L 63/10; H04L 63/108; H04L 63/0838; H04L 63/18; H04L 9/0891; H04L 41/28; H04L 43/0876; H04L 63/04; H04L 63/062; H04L 63/068; H04L 67/02; H04L 9/3213; H04L 67/10; H04L 63/20; H04L 67/42; H04L 63/0884; H04L 67/20; H04L 63/061; H04L 63/0892; H04L 9/3247; H04L 63/105; H04L 63/123; H04L 67/025; H04L 2209/80; H04L 47/70; H04L 47/805; H04L 65/1013; H04L 65/1016; H04L 12/1407; H04L 2463/082; H04L 41/0806; H04L 41/0893; H04L 41/50; H04L 41/5029; H04L 47/20; H04L 65/104; H04L 47/24; H04L 47/781; H04L 65/80; H04L 47/762; H04L 67/2852; H04L 61/2007; H04L 61/6059; H04L 63/0281; H04L 63/029; H04L 67/16; H04L 12/4633; H04L 47/2458; H04L 63/107; H04L 63/162; H04L 65/105; H04M 3/42008; H04M 3/42365; H04M 3/42382; H04M 15/60; H04M 15/63; H04M 15/66; H04M 15/8038; H04M 15/8016; H04M 15/49; H04M 2215/46; H04M 3/382; H04M 3/42272; H04M 7/006; G06F 21/335; G06F 16/9535; G06F 21/31; G06F 21/41; G06F 21/62; G06F 21/33; G06F 2211/003; G06F 21/00; G06F 21/30; G06F 21/35

See application file for complete search history.

(56) References Cited

U.S. PATENT DOCUMENTS

| | | | |
|---|---|---|---|
| 2014/0282986 | A1 | 9/2014 | Leung |
| 2014/0342731 | A1* | 11/2014 | Carames ................. H04W 8/02 455/432.1 |
| 2015/0244706 | A1* | 8/2015 | Grajek ................ H04L 63/0815 726/6 |
| 2016/0092696 | A1* | 3/2016 | Guglani ................ G06F 21/335 726/26 |
| 2016/0285874 | A1* | 9/2016 | Smith ................. H04L 61/2589 |
| 2017/0094513 | A1* | 3/2017 | Kelts ..................... H04W 12/06 |
| 2017/0264439 | A1* | 9/2017 | Muhanna .............. H04L 9/0861 |
| 2018/0020386 | A1* | 1/2018 | Chandramouli .. H04W 36/0027 |
| 2018/0083977 | A1* | 3/2018 | Murugesan ........... H04L 63/104 |
| 2018/0199279 | A1* | 7/2018 | Baek ..................... H04W 48/18 |
| 2018/0270877 | A1* | 9/2018 | Lee ........................ H04W 76/10 |
| 2018/0324585 | A1* | 11/2018 | Nair ................... H04L 63/0442 |

OTHER PUBLICATIONS

3GPP, "3rd Generation Partnership Project; Technical Specification Group Services and System Aspects; Security Architecture and Procedures for 5G System (Release 15)," 3GPP TS 33.501, V0.7.0, Jan. 2018, 109 pages.

D. Hardt, Ed., "The OAuth 2.0 Authorization Framework," Internet Engineering Task Force (IETF) Request for Comments: 6749, https://tools.ietf.org/html/rfc6749, Oct. 2012, 77 pages.

M. Jones et al., "JSON Web Token (JWT)," Internet Engineering Task Force (IETF) Request for Comments: 7519, https://tools.ietf.org/html/rfc7519, May 2015, 31 pages.

M. Jones et al., "JSON Web Signature (JWS)," Internet Engineering Task Force (IETF) Request for Comments: 7515, https://tools.ietf.org/html/rfc7515, May 2015, 60 pages.

M. Jones et al., "JSON Web Encryption (JWE)," Internet Engineering Task Force (IETF) Request for Comments: 7516, https://tools.ietf.org/html/rfc7516, May 2015, 52 pages.

M. Jones et al., "The OAuth 2.0 Authorization Framework: Bearer Token Usage," Internet Engineering Task Force (IETF) Request for Comments: 6750, https://tools.ietf.org/html/rfc6750, Oct. 2012, 19 pages.

Tim, "Analysis of different approaches for implementing SBA security over N32 reference point," 3GPP TSG SA WG3 (Security) Meeting #90, Jan. 2018, Gothenburg (Sweden), 5 pages.

Nokia, "OAuth based service authorization framework for SBA," 3GPP TSG SA WG3 (Security) Meeting #89, Nov.-Dec. 2017, Reno (US), 7 pages.

* cited by examiner

SECURITY MANAGEMENT FOR ROAMING SERVICE AUTHORIZATION IN COMMUNICATION SYSTEMS WITH SERVICE-BASED ARCHITECTURE

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises a first element or function in a visiting network of a communication system receiving a first service discovery request from a second element or function in the visiting network for services provided by at least a third element or function in a home network of the communication system, sending a second service discovery request to a fourth element or function in the home network of the communication system responsive to authenticating the second element or function, receiving from the fourth element or function a first service discovery response comprising an access token for the second element or function, and providing to the second element or function a second service discovery response comprising the access token, the access token being used by the second element or function to access the one or more services provided by the third element or function.

In another illustrative embodiment, a method comprises a fourth element in a home network of a communication system receiving from a first element or function in a visiting network of the communication system a service discovery request of a second element or function in the visiting network for services provided by a third element or function in the home network, authorizing service discovery by the second element or function utilizing a network function profile of the third element or function, generating an access token for the second element or function responsive to authorizing the service discovery, and providing to the first element or function a service discovery response comprising the access token, wherein the access token is used by the second element or function to access the one or more services provided by the third element or function.

In another illustrative embodiment, a method comprises a second element or function in a visiting network of a communication system providing to a first element or function in the visiting network a service discovery request for services provided by a third element or function in a home network of the communication system, receiving from the first element or function a service discovery response comprising an access token generated by a fourth element in the home network of the communication system, providing to the third element or function a service request comprising the access token for the one or more services provided by the third element or function, and receiving access to the requested one or more services responsive to the third element or function successfully verifying the access token.

In one or more illustrative embodiments, methods provide security management for roaming service authorization for communication systems.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
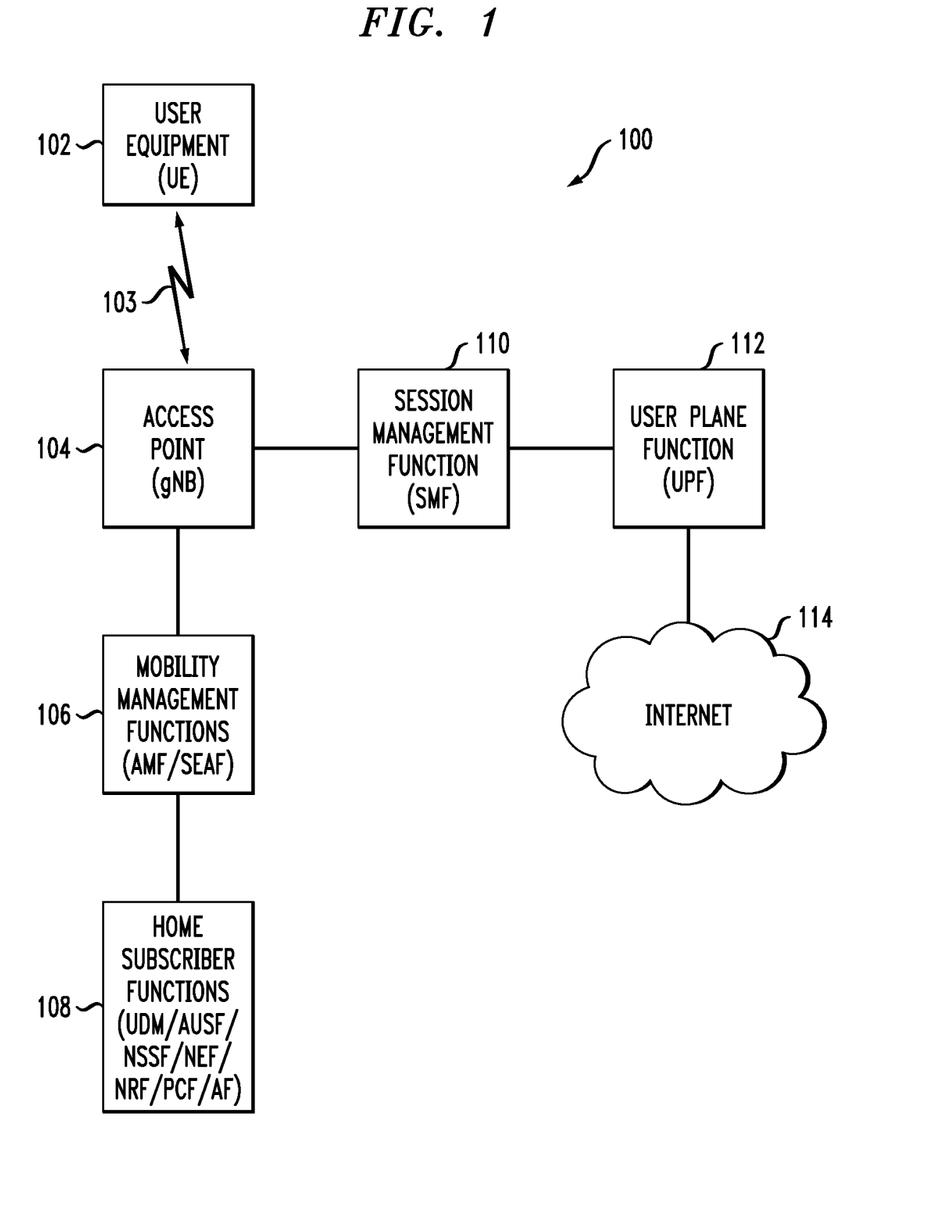
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
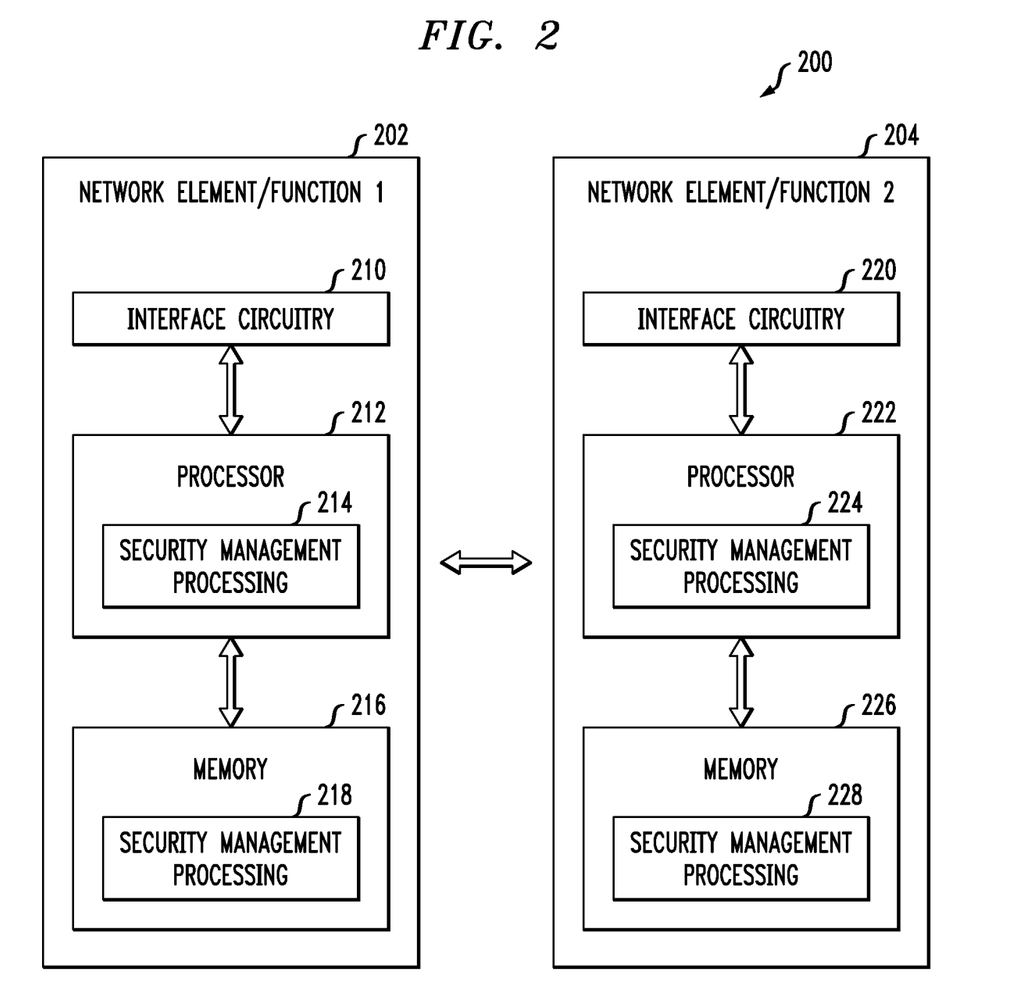
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. For example, the network elements/functions 202 and 204 may represent NF Service Consumers, NF Service Producers, Authorization Servers (e.g., NRFs in visiting and home networks), etc. which interact for service authorization as described in further detail herein.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management, such as in service authorization, described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management, such as in service authorization, described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM).

The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA). The 3GPP TS 23.502 defines procedures for the SBA.

Figure 3:
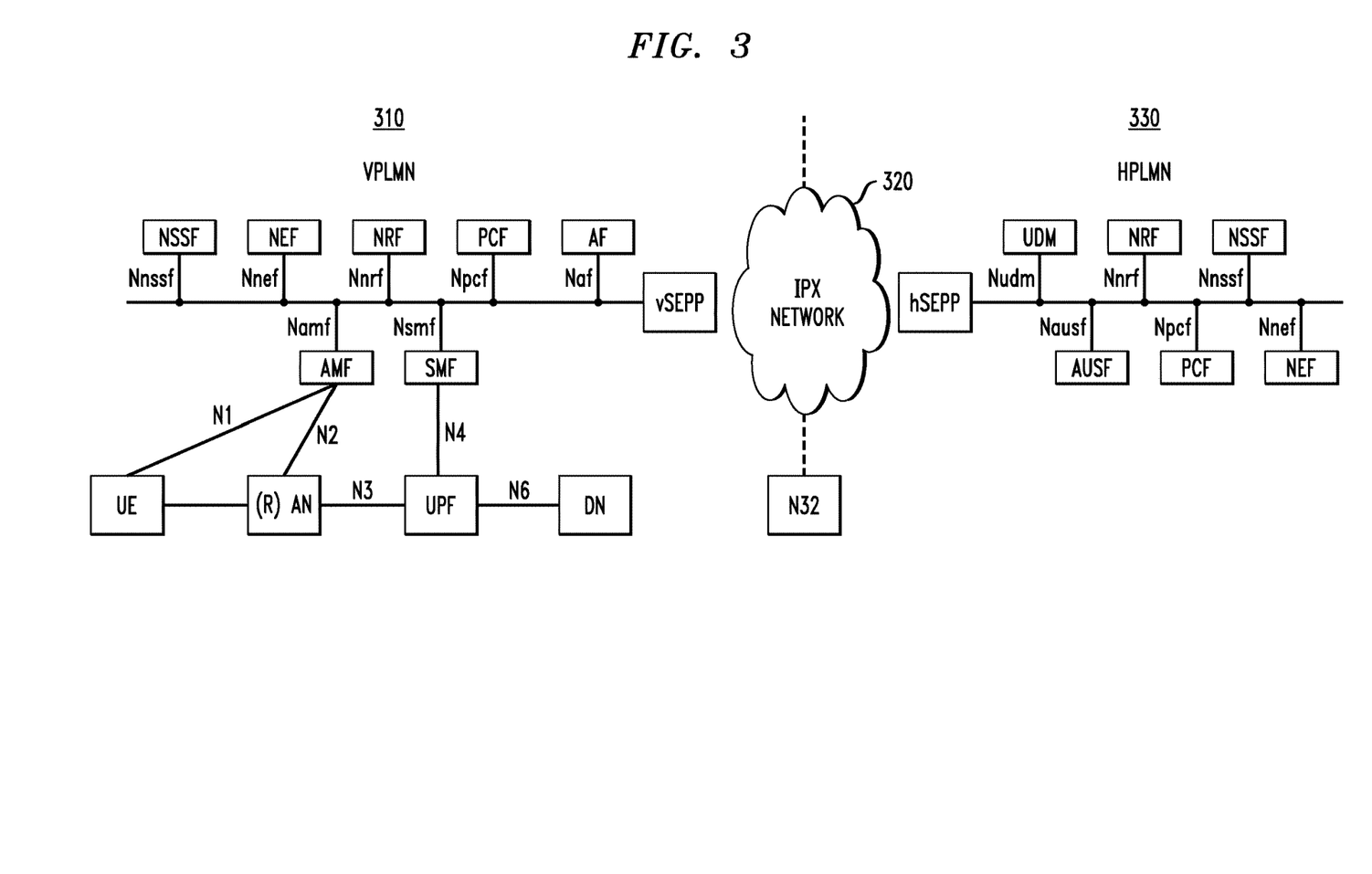
FIG. 3 illustrates a communication system architecture illustrating a service-based representation with which one or more illustrative embodiments may be implemented.

FIG. 3 depicts a 5G architecture in a configuration comprising a visiting public land mobile network (VPLMN) 310 operatively coupled via an intermediate Internetwork Packet Exchange (IPX) network 320 to a home public land mobile network (HPLMN) 330. More particularly, FIG. 3 illustrates the presence of a Security Edge Protection Proxy (SEPP) at the edge of each PLM network (e.g., vSEPP in VPLMN 310 and hSEPP in HPLMN 330). It is to be appreciated that the various network functions shown in the VPLMN 310 and the HPLMN 330 are known and described in detail in various 5G specifications such as, but not limited to, the above-referenced TS 23.501 and TS 33.501.

In the 5G SBA, services of a particular NF are provided only to authorized NF Service Consumers (e.g., other network functions) upon request. During roaming scenarios, the NF in a VPLMN (e.g., VPLMN 310) requests one or more services from a NF in the HPLMN (e.g., HPLMN 330). Therefore, service authorization procedures are required that check whether the NF Service Consumer in the VPLMN is permitted to access a requested NF Service Producer in the HPLMN for consuming a NF service.

Service authorization grants should be based on the type of NF Service Consumer, and on the service authorization information that is configured as one of the components in a NF profile of a NF Service Producer. The service authorization information may include the NF type or types and NF realms or origins that are allowed to consume the NF Service(s) of the NF Service Producer.

In 5G SBA, there are multiple NFs requesting services from each other. A service authorization framework is required that supports: (i) NF Service Consumer—NF Service Producer interactions when the two NFs are in different PLMNs (e.g., in roaming scenarios); (ii) authentication of the NF Service Consumer that is requesting access to the service(s) of another NF (e.g., services of a NF Service Producer) in a different PLMN; (iii) obtaining authorization grants during Network Function Service discovery that allow the NF Service Consumer to obtain service access of a NF in a different PLMN; (iv) using the obtained authorization grants during Network Function Service access; and (v) NF and Network Function Service registration and de-registration. In addition, a service authorization framework should be scalable for different network scenarios, including: (i) whether granularity of authorization is for a NF, or for each service within the NF; (ii) whether the granularity is per user; and (iii) whether authorization is time-based, has a duration associated with it, etc.

The OAuth 2.0 authorization framework enables third-party applications to obtain limited access to services on behalf of a resource owner by orchestrating an approval interaction between the resource owner and the service, or by allowing a third-party application to obtain access on its own behalf, as described in Internet Engineering Task Force (IETF) Request for Comments (RFC) 6749, entitled "The OAuth 2.0 Authorization Framework," which is incorporated by reference herein.

Figure 4:
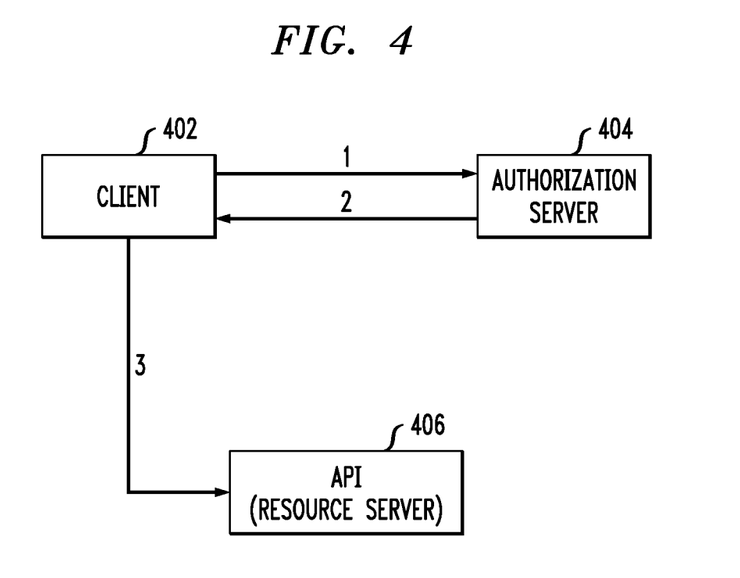
FIG. 4 illustrates a message flow for a procedure for credentials grant, according to an illustrative embodiment.

FIG. 4 provides an illustration of an OAuth Client credentials grant type, which is typically used when a client 402 is acting on its own behalf (i.e., where the client 402 is also the resource owner, or is requesting access to protected resources based on an authorization previously arranged with authorization server 404). In step 1, before invoking a Representational State Transfer (Restful) hypertext transfer protocol (HTTP) based application programming interface (API) on the resource server 406, the client 402 authenticates with the authorization server 404 by presenting its credentials. The credentials may include a client identifier (client_id) and a client secret (client_secret). The client_id is issued by the authorization server 404 when the client 402 registers with the authorization server 404 (e.g., in a separate step, which may be an out-of-band step). This registration may be part of a separate step not illustrated in FIG. 4. In step 2, the authorization server 404 validates the client 402 using the provided client_id and client_secret, and returns an access token to the client 402. In step 3, the client 402 uses the access token to call the API of resource server 406.

JavaScript Object Notation (JSON) Web Tokens (JWTs) may be used to create access tokens that assert some number of claims, as described in IETF RFC 7519, entitled "JSON Web Token (JWT)," which is incorporated by reference herein. JWT is an open standard that defines a compact and self-contained way for securely transmitting information or claims encoded as a JSON object between two parties.

JWTs are typically sent either integrity protected or encrypted, although unsecured JWTs are allowed. A JWT may be signed using JSON Web Signature (JWS). JWTs can be signed by the issuer (e.g., authorization server 404) either using a shared secret (e.g., using a keyed-hash message authentication code (HMAC) algorithm) or with a private key (e.g., an RSA private key). The JSON Web Signature (JWS) standard may be used to integrity protect JWTs. The JWS standard is described in IETF RFC 7515, entitled "JSON Web Signature (JWS)," which is incorporated by reference herein. A signed JWT is usually referred to as a JWS object.

A signed JWT or JWS includes a digital signature (e.g., when using asymmetric keys such as an RSA private key-public key pair) or a HMAC value (e.g., when a symmetric key is used). The integrity protection covers the JWT header (e.g., which includes information on the algorithm used) and the JSON payload (e.g., which includes the claim or information). The receiver party (e.g., the API resource server 406) can therefore trust the received information and independently verify the integrity of the information as its shares the secret with the issuer, or has the public key of the issuer (e.g., in cases where asymmetric keys such as RSA private key-public key pairs are used).

The JWT may be encrypted, such as utilizing JSON Web Encryption (JWE) as described in IETF RFC 7516, entitled "JSON Web Encryption (JWE)," which is incorporated by reference herein. JWTs can be encrypted with JWE if there are JSON claims that need to be concealed in storage and/or in transit. JWE supports Authenticated Encryption with Associated Data (AEAD) based cryptographic algorithms, and therefore supports the ability to provide both integrity and confidentiality services using a single algorithm. JWE may therefore be used as a single tool for both integrity protection and confidentiality of a message.

JWT may be used with the OAuth 2.0 authorization framework, as will be described with reference to the OAuth 2.0 client credentials flow of FIG. 4. Step 1 of FIG. 4 may proceed in the manner described above. In step 2 of FIG. 4, a signed or encrypted JSON Web Token or JWT is returned by the authorization server 404 as the access token. The claims in the JWT contain information required for the API resource server 406 to identify the client 402, scope of access, duration, etc. When the client 402 calls the API of resource server 406 in step 3, the client 402 sends the protected JWT in the API request, typically in the authorization header using the Bearer schema. For example, the content of the header may look like "Authorization: Bearer <token>."

Since JWTs are self-contained and secure, they can be passed on easily without any worry of being tampered. All the required information is there, and the API resource server 406 can validate the access token of client 402 on its own, thus avoiding the need for an additional call to the authorization server 404 or a look-up in a database.

For the 5G SBA service authorization framework, aspects of the OAuth 2.0 framework and JWT, JWS and JWE standardized mechanisms may be adopted. The Network Repository Functions (NRFs) in the two PLMNs (e.g., the HPLMN and the VPLMN) play the role of the OAuth Authorization server (e.g., authorization server 404 in FIG. 4) for their respective PLMNs. The NRF's public certificate is shared with all NF Service Consumers within a PLMN, such as within the HPLMN or VPLMN of FIG. 3.

NF Service Consumers play the role of the OAuth client (e.g., client 402 in FIG. 4). The client (e.g., NF Service Consumers) registers with the authorization server (e.g., its local NRF in the same PLMN) as part of the NF Registration procedure to obtain a client_id and client_secret from its local NRF. A NF Service Consumer may provide its public key during registration. The public key of the NF Service Consumer is used if the JWT needs encryption. NF Service Producers, which in the case of a roaming scenario are in the HPLMN, play the role of the OAuth resource server (e.g., resource server 406 in FIG. 4).

The NF Service Consumer invokes a service discovery procedure with its local NRF (e.g., in the VPLMN), with the request including the NF Service Consumer's client credentials. The NRF in the VPLMN (e.g., the vNRF) authenticates the client (e.g., the NF Service Consumer) based on the provided credentials. The vNRF requests a NF discovery service from the NRF in the HPLMN (e.g., the hNRF). It is assumed that, as a prerequisite, the vNRF and the hNRF have authenticated each other and that there is trust established between them. The hNRF generates a protected JWT access token and provides it in a response to the vNRF. The JWT is signed by the hNRF with the hNRF's private key.

The NF Service Consumer obtains a protected JSON Web Token or JWT at the time of NF service discovery from its local NRF (e.g., from the vNRF). The JWT may be digitally signed by the hNRF for integrity protection, or encrypted by a randomly generated Content Encryption Key (CEK) which is further protected by the NF Service Producer's public key. This requires the hNRF to be in possession of the NF Service Producer's public key (e.g., which is provided at the time of registration of the NF Service Producer).

The scope in the JWT access token indicates the authorized level of access for the NF Service Consumer. If needed, the scope will include NF services that the NF Service Consumer is authorized to access in the NF Service Producer. The NF Service Consumer presents the obtained JWT to the NF Service Producer in the HPLMN when requesting access to a service provided by the NF Service Producer. The NF Service Producer verifies the received JWT based on the hNRF's public certificate. If the verification is successful, the requested NF service is granted to the NF Service Consumer by the NF Service Producer.

The OAuth 2.0 authorization framework is the industry-standard protocol for API authorization. It is a protocol that is typically used for delegated access where a resource owner (user) grants limited access to his resources on one site (protected resource), to another site (client), without having to expose his secret credentials (password, etc.). OAuth is also widely popular in machine to machine scenarios where there is no user involved, and service interaction is between two independent services (e.g., NFs). In the context of Restful API access, OAuth 2.0 can be used for granting clients limited access to a protected web service or API. This is done by an authorization server which issues access tokens to the clients.

The OAuth 2.0 framework defines the following roles: (i) resource owner (e.g., the user); (ii) resource server (e.g., the API server); (iii) client; and (iv) authorization server. The resource owner is an entity capable of granting access to a protected resource. When the resource owner is a person, it is referred to as an end-user. The resource server is a server hosting the protected resources, capable of accepting and responding to protected resource requests using access tokens. This is the API the client wants to access. The client is an application making protected resource requests on behalf of the resource owner and with its authorization. The authorization server is the server issuing access tokens to the client after successfully authenticating the resource owner and obtaining authorization.

IETF RFC 6749,

"Instead of using the resource owner's credentials to access protected resources, the client obtains an access token—string denoting a specific scope, lifetime, and other access attributes. Access tokens are issued to third-party clients by an authorization server with the approval of the resource owner. The client uses the access token to access the protected resources hosted by the resource server.

For example, an end-user (resource owner) can grant a printing service (client) access to her protected photos stored at a photo-sharing service (resource server), without sharing her username and password with the printing service. Instead, she authenticates directly with a server trusted by the photo-sharing service (authorization server), which issues the printing service delegation-specific credentials (access token)."

OAuth 2.0 supports several different grants or ways of retrieving an access token. Deciding which type of grant to use depends mostly on the type of client. An Authorization Code Grant is used to access an API from a regular web application based client. Authorization Code using Proof Key for Code Exchange (PKCE) is used to access an API from a mobile application. An Implicit Grant is used to access an API from a client-side application (e.g., a JavaScript application running within a browser). A Resource Owner Password Grant is used by highly trusted applications to access an API. The Resource Owner Password Grant is used when there is a high degree of trust between the user and the client. A Client Credentials Grant is used to access an API from a Non-Interactive Client (e.g., a service running on a machine). The Client Credentials Grant is used in machine-to-machine interfaces where the client is also the resource owner, and is suitable for server-to-server interfaces.

In 5G SBA, NF service authorization is required to ensure that NF Service Consumers are authorized to access NF services provided by NF Service Providers. The OAuth 2.0 Client Credentials Grant type fits well for this purpose. When the Client Credentials Grant type is used, the NF Service Consumer is the client (and the resource owner), and the NF Service Producer is the API or resource server.

The Client Credentials Grant type is typically used when the client is acting on its own behalf (e.g., when the client is also the resource owner), or is requesting access to protected resources based on an authorization previously arranged with the authorization server. Thus, as shown in FIG. 4, the client 402 before invoking the Restful HTTP based API of resource server 406 authenticates with the authorization server 404 in step 1 by presenting its credentials (e.g., its client_id and client_secret). The client_id and client_secret, or more generally the client credentials, are issued by the authorization server 404 when the client 402 registers with the authorization server 404 (e.g., in an out-of-band step). In step 2 of FIG. 4, the authorization server 404 validates the client 402 and returns an access token. The client 402 in step 3 of FIG. 4 uses the access token to call the API of resource server 406.

The access token is a credential that can be used by a client to access an API. The purpose of the access token is to inform the API that the bearer of the token has been authorized to access the API and perform specific actions (as specified by the scope that has been granted). The access token is usually used as a Bearer credential and transmitted in an HTTP Authorization header to the API. Additional details regarding bearer access tokens are described in IETF RFC 6750, entitled "The OAuth 2.0 Authorization Framework: Bearer Token Usage," which is incorporated by reference herein.

The access token is typically one of two types: (i) Opaque String; and (ii) JSON Web Token or JWT. The Opaque String type, described in IETF RFC 6750, has an associated scope and lifetime. The access token is of type bearer, where whoever holds the token can make an HTTP request to the protected web API. The caveat for this token type is that access tokens must be kept secret always and only used over secure HTTP (HTTPS)—there is no built-in protection. Validation is done out of band by the resource server through its interface with the authorization server.

JWT, as described above, is an open standard that defines a compact and self-contained way for securely transmitting information or claims encoded as a JSON object between two parties. JWTs are typically sent either integrity protected or encrypted, although unsecured JWTs are allowed. The JWT may be signed using JWS, where the JWT is signed by the issuer (e.g., the authorization server) either using a shared secret or with its private key. The JSON Web Signature or JWS standard is used to integrity protect JWTs. A signed JWT is usually referred to as a JWS object. A signed JWT or JWS includes a digital signature or an HMAC value. The integrity protection covers: (i) the JWT Header, which includes information on the algorithm used; and (ii) the JSON Payload, which includes the claim or information. The receiver party (e.g., the API or resource server) can therefore trust the received information and independently verify the integrity of the information as it shares the secret with the issuer or has the public key of the issuer.

In some cases, the JWT is encrypted using JWE as described above. Encrypted JWT using JWE may be used if there are JSON claims in the access token that need to be concealed in storage and transit. JWE supports AEAD based crypto algorithms, and therefore supports the ability to provide both integrity and confidentiality services using a single algorithm. JWE may therefore be used as a single tool for both integrity protection and confidentiality of the message.

Integrity protecting JWT with JSON Web Signature or JWS will now be described in further detail. The JWT includes three parts, each separated by a dot—a header, payload and a signature. Thus, a JWT looks like "Header.Payload.Signature". The JWT header carries two parts, a first part declaring the type, which is JWT, and a second part indicating the hashing algorithm to use. An example JWT header is:

```
{
"typ":"JWT",
"alg":"RS256"
}
``` where "RS256" in this example denotes an RSA public/private key pair. Once base64 encoded, the first part of the JSON is: eyJhbGciOiJIUzI1NiIsInR5cCI6IkpXVCJ9.

The JWT payload contains the JWT claims. The JWT payload is where the information to transmit is put, along with other information about the access token. There are multiple claims that may be provided, including registered claim names, public claim names and private claim names. Examples of Internet Assigned Numbers Authority (IANA) registered claims include: (i) iss—the issuer of the token; (ii) sub—the subject of the token; (iii) and—the audience of the token; (iv) exp—defines the expiration time on or after which the JWT must not be accepted for processing; (v) nbf—defines the time before which the JWT must not be accepted for processing; (vi) iat—the time the JWT was issued, which can be used to determine the age of the JWT;

and (vii) jti—a unique identifier for the JWT, which can be used to prevent the JWT from being replayed and is helpful for one time use tokens. Public claims are claims that the system can create itself, and can be anything such as a user name, IP address, etc. Private claims are claims that a NF Service Producer and NF Service Consumer may agree to that are private. It is to be appreciated that the specific types of claims described above are presented by way of example only, and that embodiments are not limited solely to use with the above-described claims.

An example JWT payload with two registered claims (iss and exp) and two public claims (name and IP address) is:

```
{
  "iss":"3gpp.org",
  "exp":1300819380,
  "name":"FirstName LastName",
  "IP address":"10.10.10.10"
}
```

Once the JWT payload is base64 encoded, the second part of the JSON is: eyJpc3MiOiJzY290Y2guaW8iLCJleHAiOjEzM.

The JWT signature is the third part of the JWT. The signature is made up of a hash of the header, the payload and a secret. For example, with HMAC SHA 256, the JWT signature is HMACSHA256(encoded string of the header and payload, 'secret'). The third part of the JWT using the examples above is thus 03f329983b86f7d9a9f5fef85305880101d5e302afa.

The signed JWT or JWS is a concatenation of the three parts, separated by periods. Again, continuing with the above example JWT, the JWS is: "eyJhbGciOiJIUzI1NiIsInR5cCI6IkpXVCJ9. eyJpc3MiOiJzY290Y2guaW8iLCJleHAiOjEz M.03f329983b86f7d9a9f5fef85305880101d5e302afa".

As mentioned above, in the 5G SBA service authorization framework the OAuth 2.0 roles are performed as follows: the vNRF is the OAuth 2.0 authorization server and authenticates the NF Service Consumer; the hNRF is the OAuth 2.0 authorization server and generates the JSON Web Token or JWT; the NF Service Consumer in the VPLMN is the OAuth 2.0 client; and the NF Service Producer in the HPLMN is the OAuth 2.0 resource server. In the description below, it is assumed that an RSA digital signature scheme is used to integrity protect the JWT. It should be appreciated, however, that other types of signature schemes and more generally other types of integrity protection may be used, including HMAC or symmetric key approaches. The hNRF is the entity that generates the JWT based access token and computes a digital signature on it. The security mechanism is based on public key/private key pair using RSA. The hNRF's private key is used to digitally sign the access token. Every NF in the SBA, such as the NF Service Producer, has in its possession the hNRF's public key, which it obtained during registration. The NF Service Producer in the HPLMN uses the hNRF public key to verify the digital signature when it receives a JWT based access token from a NF Service Consumer in the VPLMN.

Figure 5:
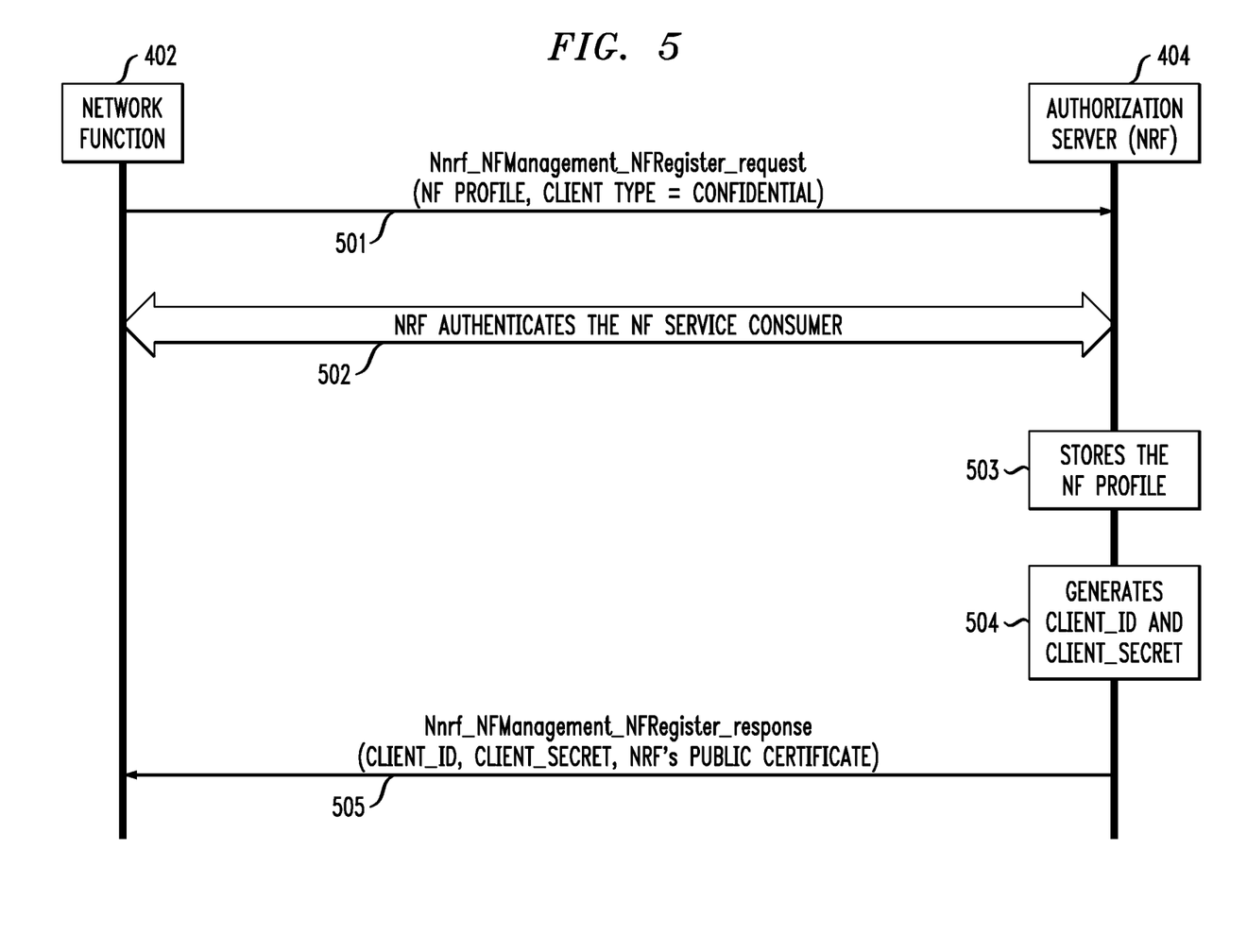
FIG. 5 illustrates a message flow for a procedure for network function registration, according to an illustrative embodiment.

FIG. 5 illustrates a message flow for NF service registration. NF service registration procedure between NFs and NRF is defined in clause 4.17.1 of TS 23.502. It is used as the underlying procedure to perform OAuth client registration (e.g., of a NF 402) with the OAuth server (e.g., NRF 404). In FIG. 5, the NRF 404 is assumed to represent the local NRF for the NF 402. In roaming scenarios described herein, the NF 402 may be part of a VPLMN and the local NRF is thus a vNRF in the VPLMN. The FIG. 5 registration procedure, however, may also be performed by NFs in the HPLMN with the hNRF. For example, the NF Service Producer in the HPLMN may register with the hNRF using the message flow of FIG. 5 or FIG. 6.

The NF 402 in step 501 provides its client type and profile information when it registers with the NRF 404 (e.g., using a Nnrf_NFManagement_NFRegister_request). In step 502, the NRF 404 authenticates the NF 402 before registering the NF 402. In the process, the NRF 404 stores the profile of the NF 402 in step 503 and generates a client_id (e.g., a username) and client_secret (e.g., a password) for NF 402 in step 504. The NRF 404 provides the client_id and client_secret, along with its public key certificate, in the registration response (e.g., Nnrf_NFManagement_NFRegister_response) in step 505.

Figure 6:
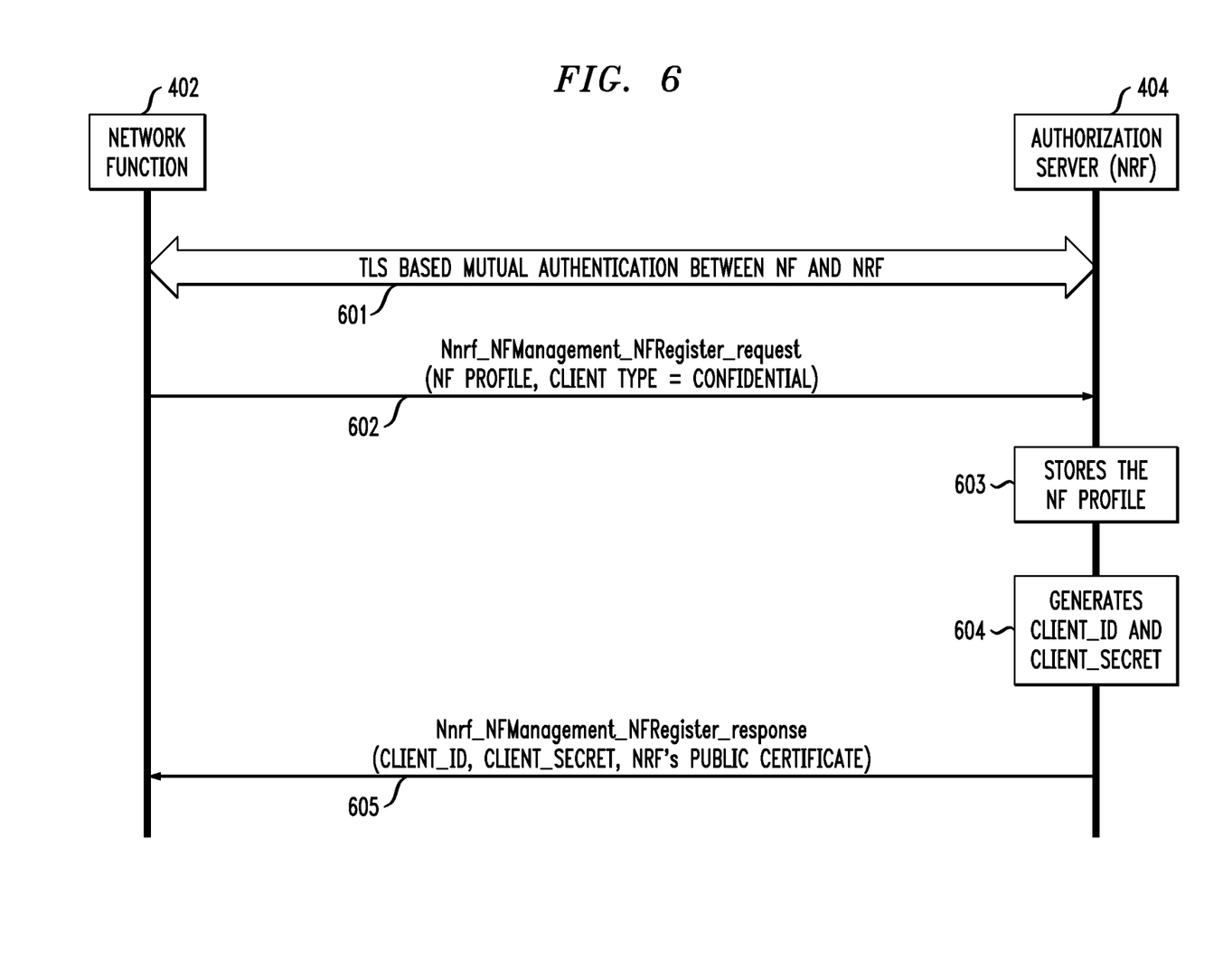
FIG. 6 illustrates a message flow for a procedure for network function registration with mutual authentication, according to an illustrative embodiment.

FIG. 6 illustrates a message flow for NF service registration with TLS based mutual authentication between the NF 402 and NRF 404. Similar to FIG. 5, the NRF 404 is assumed to represent the local NRF for the NF 402 (e.g., the NRF in the same PLMN as the NF 402). The mutual authentication may be Transport Layer Security (TLS) certificate based mutual authentication between the NF 402 and NRF 404 in step 601. A secure connection is thus established between the NF 402 and NRF 404. The NF service registration is then performed over the secure connection. Steps 602, 603, 604 and 605 are the same as steps 502, 503, 504 and 505 in the FIG. 5 message flow. In step 605 of the FIG. 6 message flow, however, it may not be required to provide the NRF 404's certificate in the registration response since the mutual authentication in step 601 may be performed based on certificates.

Figure 7:
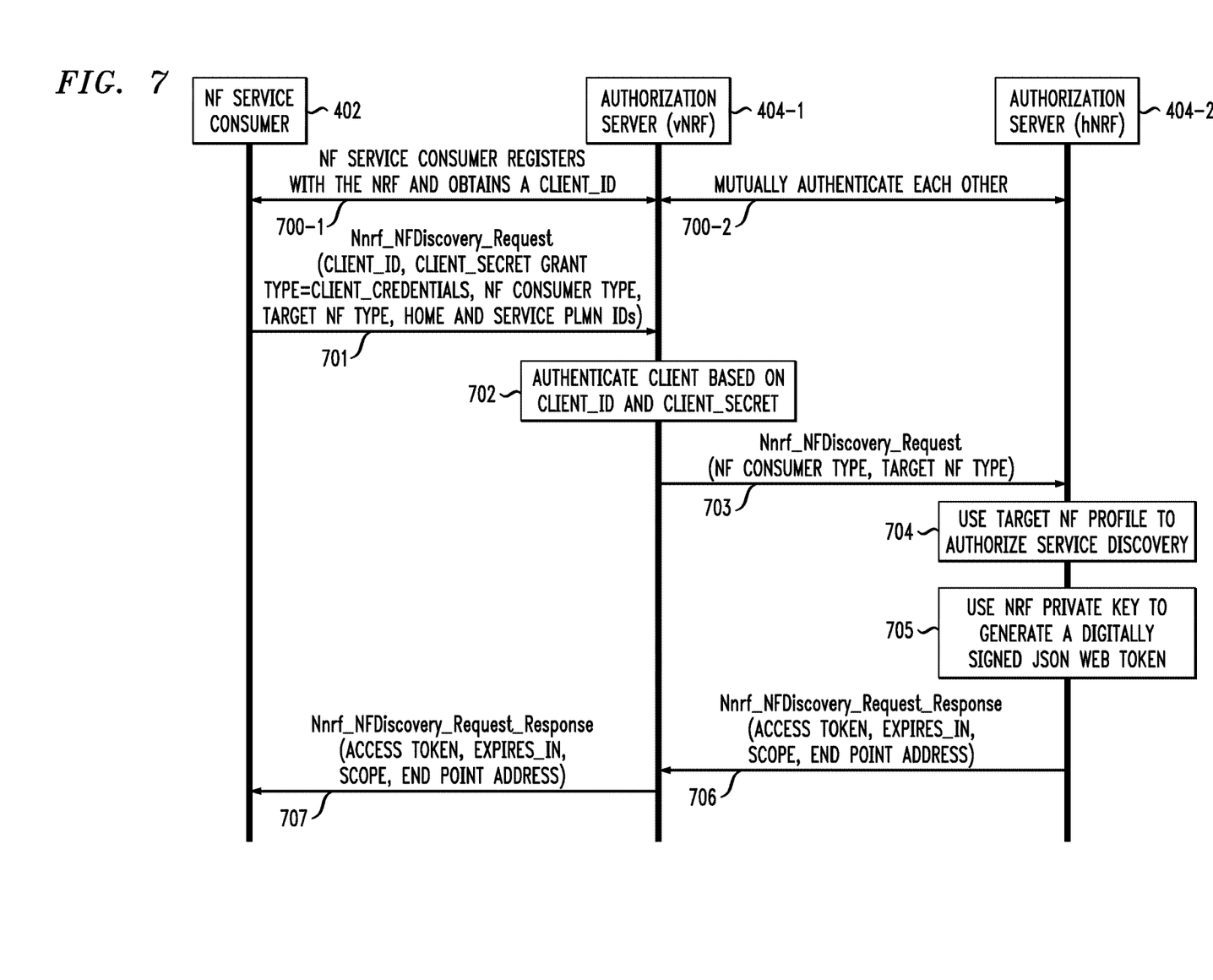
FIG. 7 illustrates a message flow for a procedure for a network function service consumer to obtain an access token during network function service discovery, according to an illustrative embodiment.

FIG. 7 illustrates a message flow for the NF 402 to obtain an access token during network function service discovery with the vNRF 404-1 and the hNRF 404-2. NF service discovery procedure between NFs and NRF in the same PLMN (e.g., such as in one of the HPLMN or VPLMN of FIG. 3) is defined in clause 4.17.4 of TS 23.502. It is used as the underlying procedure by the NF Service Consumer to obtain an access token from the NRF authorization server.

In step 700-1, as a prerequisite, the NF Service Consumer 402 registers with its local NRF and obtains the client_id and client password or client_secret. In roaming scenarios described herein, the NF Service Consumer 402 represents a NF in the VPLMN, and thus the local NRF is the vNRF 404-1 in the VPLMN. Also as a prerequisite, the NF Service Producer 406 registers with its local NRF (the hNRF 404-2) and obtains the hNRF 404-2's public key (not shown in FIG. 7). The hNRF 404-2's public key is used in some embodiments for validating digital signatures as described elsewhere herein. In step 700-2, the vNRF 404-1 and the hNRF 404-2 mutually authenticate each other. Step 700-2 may be performed prior to, concurrently with, or after step 700-1.

The NF Service Consumer 402 in step 701 invokes the Nnrf_NFDiscovery_Request (e.g., which may include an expected NF service name, NF type of the expected NF instance, the NF type of the NF Service Consumer, home and serving PLMN IDs, etc.) from the vNRF 404-1 in the same PLMN. As an OAuth client, the NF Service Consumer 402 in step 701 also sends its client_id and client_secret, or more generally its client credentials, in the request message.

The vNRF 404-1 (e.g., the local NRF for the NF Service Consumer 402) in step 702 authenticates the client NF Service Consumer 402 based on the provided client credentials. If the NF Service Consumer 402 is successfully authenticated, the vNRF 404-1 identifies the NRF in the HPLMN (i.e., hNRF 404-2) based on the home PLMN ID included in the Nnrf_NFDiscovery_Request received in step 701. The vNRF 404-1 then requests discovery from the hNRF 404-2 in step 703 by sending an Nnrf_NFDiscovery_Request to the hNRF 404-2. The vNRF 404-1 thus discovers with the hNRF 404-2 on behalf of the NF Service Consumer 402. The vNRF 404 1 forwards parameters obtained from the NF Service Consumer 402, such as the NF Service Consumer type, etc. to the hNRF 404-2.

In step 704, the hNRF 404-2 checks the stored NF profile information of the target NF and/or NF service (e.g., of NF Service Producer 406) to determine whether the access can be permitted to the NF type of the NF Service Consumer 402.

If the requested service can be provided to the NF Service Consumer 402 of the declared type, the hNRF 404-2 in step 705 generates a JWT based access token with appropriate claims included. The generated JWT is signed with the hNRF 404-2's private key. The claims in the JWT access token include the identity of the hNRF 404-2 (e.g., the issuer), the identity of the NF Service Consumer 402 (e.g., the subject), the identity of the NF instance (e.g., NF Service Producer 406) that provides the requested service (e.g., the audience), the expiration time, etc. In some embodiments, the hNRF 404-2 may restrict access to specific services in the NF Service Producer 406. In such cases, the hNRF 404-2 in step 705 may include an authorized set of services in a separate claim (e.g., the scope) in the JWT access token.

In step 706, the signed JWT access token is included in an Nnrf_NFDiscovery_Request response message that is sent from the hNRF 404-2 to the vNRF 404-1. The response message of step 706 may also include an expiration time (e.g., expires_in), an end point address for the discovered NF instance, etc. The scope and expires_in may be equivalent to the corresponding claims in the JWT access token from step 705. The scope field may include all the services that the NF Service Consumer 402 is authorized to access. In step 707, the vNRF 404-1 forwards the response message received in step 706 to the NF Service Consumer 402.

Figure 8:
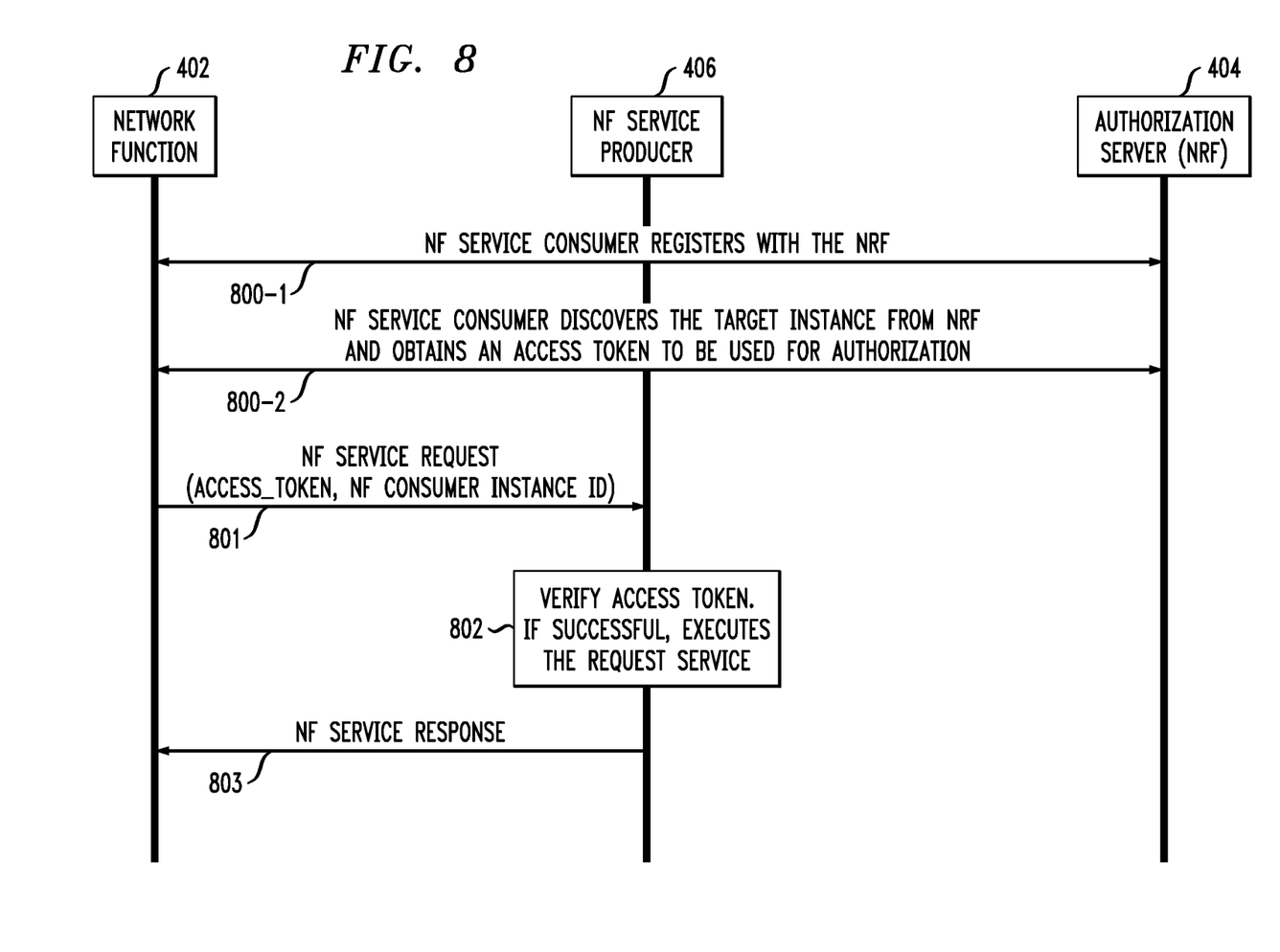
FIG. 8 illustrates a message flow for a procedure for a network function service consumer to request service access from a network function service provider using an access token, according to an illustrative embodiment.

FIG. 8 illustrates a message flow for a NF Service Consumer 402 to request service access from a NF Service Producer 406 using the access token received in the FIG. 7 message flow. The access token is included in an API that is invoked by the NF Service Consumer 402 to access one or more NFs of the NF Service Producer 406. The NF Service Producer 406 is assumed to be located in the HPLMN.

In step 800-1, the NF Service Consumer 402 registers with the NRF 404, such as using the message flow of FIG. 5 or FIG. 6. In this context, the NRF 404 represents the vNRF 404-1. The NF Service Producer 406 registers with the hNRF 404-2, which is not shown in FIG. 8. In step 800-2, the NF Service Consumer 402 discovers the target instance from the NRF 404 and obtains the access token to be used for authorization, such as using the message flow of FIG. 7. In step 801, the NF Service Consumer 402 invokes the API for a specific service on the NF Service Producer 406. The parameters included in the API include the access_token, along with the NF Service Consumer 402 instance id. The instance id must match what is included in the "subject" claim of the access token.

In step 802, the NF Service Producer 406 verifies the access token. Verifying the access token in some embodiments includes checking that the JWT is well formed, checking the signature of the JWT using the NRF 404's public key, validating the standard claims in the access token (e.g., the subject, expiration time, issuer, audience claims, etc.), and checking the client permissions (e.g., the scope in the access token). If the checks are successful, the NF Service Producer 406 is assured that the access token received in step 801 was issued by its local NRF 404 (e.g., hNRF 404-2) and that the access token was issued to the correct NF Service Consumer 402 (e.g., identifier match) in the VPLMN. In addition, the NF Service Producer 406 knows the exact scope that the NF Service Consumer 402 has been authorized by the NRF 404. In step 803, responsive to successful verification of the access token, the NF Service Producer 406 executes the requested service and provides a NF service response to the NF Service Consumer 402.

It should be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
in a first network entity of a visiting network of a communication system, receiving a first service discovery request from a second network entity of the visiting network for services provided by at least a third network entity of a home network of the communication system;
authenticating, by the first network entity, the second network entity;
responsive to authenticating the second network entity, sending a second service discovery request to a fourth network entity of the home network of the communication system;
receiving, at the first network entity from the fourth network entity, a first service discovery response comprising an access token for the second network entity; and
providing, from the first network entity to the second network entity, a second service discovery response comprising the access token, the access token being used by the second network entity to access the one or more services provided by the third network entity;
wherein the first service discovery request comprises identifying information for the second network entity;
wherein each of the first service discovery response and the second service discovery response comprises information regarding a scope of access to the third network entity provided by the access token, the scope of access being based at least in part on the identifying information of the second network entity; and
wherein the method is performed by at least one processing device comprising a processor coupled to a memory.

2. The method of claim 1, wherein the first network entity comprises a visiting Network Repository Function (vNRF) of a 5G communication system and wherein the fourth network entity comprises a home Network Repository Function (hNRF) of the 5G communication system.

3. The method of claim 2, further comprising authenticating the second network entity using the client identifier and the client secret.

4. The method of claim 2, wherein the second service discovery request comprises the network function consumer type of the second network entity and the target network function type of the third network entity.

5. The method of claim 1, wherein the first service discovery request comprises:
   a client identifier and a client secret of the second network entity;
   a network function consumer type of the second network entity;
   a target network function type of the third network entity;
   an identifier of the home network of the communication system; and
   an identifier of the visiting network of the communication system.

6. The method of claim 1, wherein the first service discovery response and the second discovery response comprise:
   the access token;
   an expiration time of the access token;
   a scope of the access token; and
   an end point address of the third network entity in the home network of the communication system.

7. The method of claim 1, wherein the access token comprises first information identifying the fourth network entity in the home network as an issuer of the access token, second information identifying the second network entity in the visiting network as the subject of the access token, third information identifying the third network entity in the home network providing requested services as an audience of the access token, and fourth information specifying an expiration time of the access token.

8. The method of claim 7, wherein the access token further comprises fifth information identifying a set of authorized services for the second network entity as the scope of the access token.

9. The method of claim 1, wherein the access token comprises a JavaScript Object Notation (JSON) Web Token (JWT) that is digitally signed using a private key of the fourth network entity.

10. Apparatus comprising the first network entity in the visiting network of the communication system configured to perform the steps of claim 1.

11. An article of manufacture comprising a non-transitory computer-readable storage medium having embodied therein executable program code that when executed by a processor causes the processor to perform the steps of claim 1.

12. A method comprising:
   receiving, from a first network entity of a visiting network of a communication system at a fourth network entity of a home network of the communication system, a service discovery request of a second network entity of the visiting network for services provided by a third network entity of the home network;
   authorizing service discovery by the second network entity utilizing a network function profile of the third element or function;
   generating an access token for the second network entity responsive to authorizing the service discovery; and
   providing, from the fourth network entity to the first network entity, a service discovery response comprising the access token;
   wherein the access token is used by the second network entity to access the one or more services provided by the third network entity;
   wherein the service discovery request comprises identifying information for the second network entity;
   wherein the service discovery response comprises information regarding a scope of access to the third network entity provided by the access token, the scope of access being based at least in part on the identifying information of the second network entity; and
   wherein the method is performed by at least one processing device comprising a processor coupled to a memory.

13. The method of claim 12, wherein the service discovery request received at the fourth network entity comprises a network function consumer type of the second network entity and a target network function type of the third network entity, and wherein authorizing service discovery by the second element or function is based at least in part on:
   a network function profile of the third network entity determined using the target network function type of the third network entity; and
   the network function consumer type of the second network entity.

14. The method of claim 12, wherein the access token comprises a JavaScript Object Notation (JSON) Web Token (JWT) that is digitally signed using a private key of the fourth network entity.

15. The method of claim 12, wherein the access token comprises first information identifying the fourth network entity in the home network as an issuer of the access token, second information identifying the second network entity in the visiting network as the subject of the access token, third information identifying the third network entity in the home network providing requested services as an audience of the access token, and fourth information specifying an expiration time of the access token.

16. The method of claim 15, wherein the access token further comprises fifth information identifying a set of authorized services for the second network entity as the scope of the access token.

17. The method of claim 12, wherein the service discovery response comprises:
   the access token;
   an expiration time of the access token;
   a scope of the access token; and
   an end point address of the third network entity in the home network of the communication system.

18. Apparatus comprising the fourth network entity in the home network of the communication system configured to perform the steps of claim 12.

19. An article of manufacture comprising a non-transitory computer-readable storage medium having embodied therein executable program code that when executed by a processor causes the processor to perform the steps of claim 12.

20. A method comprising:
   providing, to a first network entity of a visiting network of a communication system from a second network entity of the visiting network, a service discovery request for services provided by a third network entity of a home network of the communication system;
   receiving, at the second network entity from the first network entity, a service discovery response comprising an access token generated by a fourth that is an network entity of the home network of the communication system;
   providing, from the second network entity to the third network entity, a service request comprising the access token for the one or more services provided by the third network entity; and receiving access to the requested one or more services responsive to the third network entity successfully verifying the access token;

wherein the service discovery request comprises identifying information for the second network entity;

wherein the service discovery response comprises information regarding a scope of access to the third network entity provided by the access token, the scope of access being based at least in part on the identifying information of the second network entity; and wherein the method is performed by at least one processing device comprising a processor coupled to a memory.

21. Apparatus comprising the second network entity in the visiting network of the communication system configured to perform the steps of claim 20.

22. An article of manufacture comprising a non-transitory computer-readable storage medium having embodied therein executable program code that when executed by a processor causes the processor to perform the steps of claim 20.

* * * * *